United States Patent
Berkcan et al.

(10) Patent No.: US 9,986,312 B2
(45) Date of Patent: *May 29, 2018

(54) PASSIVE WIRELESS SENSORS FOR TURBOMACHINES AND METHOD OF OPERATING THE SAME

(71) Applicant: General Electric Company, Schenectady, NY (US)

(72) Inventors: Ertugrul Berkcan, Clifton Park, NY (US); Yongjae Lee, Latham, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 136 days.

This patent is subject to a terminal disclaimer.

(21) Appl. No.: 14/840,975

(22) Filed: Aug. 31, 2015

(65) Prior Publication Data
US 2017/0064415 A1 Mar. 2, 2017

(51) Int. Cl.
*G08C 19/22* (2006.01)
*H04Q 9/00* (2006.01)
*F01D 21/00* (2006.01)

(52) U.S. Cl.
CPC ............ *H04Q 9/00* (2013.01); *F01D 21/003* (2013.01); *F05D 2220/32* (2013.01); *F05D 2220/76* (2013.01); *F05D 2260/80* (2013.01); *F05D 2270/303* (2013.01); *H04Q 2209/40* (2013.01); *Y02T 50/672* (2013.01)

(58) Field of Classification Search
CPC ........ H04Q 9/00; H04Q 2209/40; F02C 3/04; F05D 2220/32; F05D 2220/76
USPC ...................... 340/870.07–870.09; 73/112.01
See application file for complete search history.

(56) References Cited

U.S. PATENT DOCUMENTS

| 6,974,641 | B1 | 12/2005 | Choy et al. |
| 7,231,180 | B2 | 6/2007 | Benson et al. |
| 7,368,827 | B2 | 5/2008 | Kulkarni et al. |
| 7,510,776 | B2 | 3/2009 | Choy et al. |
| 8,136,988 | B2 | 3/2012 | Geren et al. |
| 8,173,266 | B2 | 5/2012 | Choy et al. |

(Continued)

OTHER PUBLICATIONS

Karim H et al.,"Concept and model of a metamaterial based passive wireless temperature sensor for harsh environment applications", Sensors Journal, IEEE, vol. 15, Issue: 3; pp. 1445-1452, Mar. 2015.

(Continued)

*Primary Examiner* — George Bugg
*Assistant Examiner* — Sharmin Akhter
(74) *Attorney, Agent, or Firm* — John P. Darling (57) ABSTRACT

A machine includes a first machine substrate and a second machine substrate and a monitoring system for the machine. The monitoring system includes a sensor subsystem including a sensor substrate integral with the first machine substrate and at least one sensor electromagnetic structure coupled to at least a portion of the sensor substrate. The at least one sensor electromagnetic structure includes at least one sensor conducting sub-component. The at least one sensor electromagnetic structure is configured to regulate electromagnetic fields incident thereto in response to at least one measurement characteristic of a machine measurand. The sensor subsystem is configured to obtain at least one measurement characteristic of the machine measurand proximate a machine sensing position.

20 Claims, 5 Drawing Sheets

(56) References Cited

U.S. PATENT DOCUMENTS

| | | | |
|---|---|---|---|
| 8,486,545 B2 | 7/2013 | Lanning et al. | |
| 8,519,866 B2 | 8/2013 | Mitchell et al. | |
| 8,568,026 B2 * | 10/2013 | Gregory | F01D 17/085 29/601 |
| 8,599,082 B2 | 12/2013 | Mitchell et al. | |
| 8,629,783 B2 | 1/2014 | Mitchell et al. | |
| 8,718,979 B2 | 5/2014 | Berkcan et al. | |
| 8,742,944 B2 | 6/2014 | Mitchell et al. | |
| 8,868,355 B2 | 10/2014 | Huang et al. | |
| 8,924,182 B2 | 12/2014 | Berkcan et al. | |
| 2010/0117919 A1 * | 5/2010 | Mizuno | G06K 7/10346 343/846 |
| 2011/0040498 A1 | 2/2011 | Huang et al. | |
| 2013/0312533 A1 * | 11/2013 | Berkcan | G01B 7/16 73/773 |
| 2013/0332011 A1 | 12/2013 | Ziarno | |
| 2014/0052410 A1 | 2/2014 | Tralshawala et al. | |
| 2015/0128707 A1 * | 5/2015 | Viikari | G01H 13/00 73/584 |

OTHER PUBLICATIONS

Cunha M et al.,"Wireless acoustic wave sensors and systems for harsh environment applications", Wireless Sensors and Sensor Networks (WiSNet), 2011 IEEE Topical Conference on, pp. 41-44, Jan. 16-19, 2011, Phoenix, AZ.

Gomes, R.P.N. et al., "A hybrid sensor network for the real-time condition monitoring of rotating machinery", Distributed Computing in Sensor Systems Workshops (DCOSSW), 2010 6th IEEE International Conference on, IEEE Xplore, pp. 1-2, Jun. 21-23, 2010, Conference Location : Santa Barbara, CA.

U.S. Appl. No. 14/598,526, filed Jan. 16, 2015, entitled Passive Wireless Sensors for Turbomachines and Method of Operating the Same.

* cited by examiner

FIG. 5 ically. Output of the
PASSIVE WIRELESS SENSORS FOR TURBOMACHINES AND METHOD OF OPERATING THE SAME

BACKGROUND

The field of the disclosure relates generally to passive wireless sensors and, more particularly, to passive wireless sensors for turbomachines.

At least some known turbomachines, i.e., gas turbine engines compress air via a plurality of rotatable compressor blades and ignite a fuel-air mixture in a combustor to generate combustion gases that are channeled through rotatable turbine buckets via a hot gas path. Also, at least some other known turbomachines, i.e., steam turbine engines channel steam through rotatable buckets via a steam path. Such known turbomachines convert thermal energy of the combustion gas stream and steam, respectively, to mechanical energy used to rotate a turbine shaft. Output of the turbomachines may be used to power a machine, for example, an electric generator, a compressor, or a pump.

Many of these known turbomachines include known sensing devices that are configured to withstand high temperatures and the stresses and strains associated with high-temperature environments for only a short period of time, i.e., 100 hours or less. Some such known sensing devices include measurement instruments coupled to, within a gas turbine, for example, combustor assemblies. Such known coupled sensing devices typically require extensive wiring as well as modifications to the combustor assemblies to accommodate the wiring. Therefore, such measurement systems increase construction and maintenance costs.

Other known wireless sensing devices are deposited on the combustors through a printing process. Yet other known wireless sensing devices are formed in layers on the surfaces of the high-temperature components. Moreover, other known wireless sensing devices are embedded within the high-temperature components, e.g., inserted into slots defined within the components during manufacturing. Furthermore, some known wireless sensing devices require the substrate (for ground layers or ground plane) and dielectric features of the components to which the sensing devices will be affixed. These five methods of coupling, i.e., affixing sensors to high-temperature components require addition of at least some of the sensor components to the high-temperature components subsequent to manufacture of such components. As such, these methods lend themselves to adoption by non-original equipment manufacturers (OEMs). Moreover, post-manufacture affixing of portions of the sensing devices to the high-temperature components has a potential for not fully integrating the sensors with the high-temperature components. In addition, the most appropriate or desired position on the high-temperature components for affixing devices may not be available. Specifically, while certain portions of components or certain components exposed to high-temperature conditions, e.g., 500° Celsius (° C.) to 1000° C., and the associated substrates are coated appropriately, other components or portions thereof will be exposed to lower temperatures, e.g., approximately 200° C. will likely not be coated, therefore these regions will not have the necessary dielectric properties. Also, some component surfaces, i.e., substrates may be unacceptable as a substrate for the sensing devices.

Further, such issues with known stationary surfaces within a turbomachine are similar for rotational components therein, e.g., compressor blades and turbine buckets. Such rotational components also have additional issues such as high-velocity rotational effects and connectivity issues associated with the rotational operation of the monitored components and the difficulties with transmitting measurement data from the blades and buckets to an external data storage and analysis unit.

BRIEF DESCRIPTION

In one aspect, a monitoring system for a machine is provided. The machine includes a first machine substrate and a second machine substrate. The monitoring system includes a sensor subsystem including a sensor substrate integral with the first machine substrate. The sensor subsystem also includes at least one sensor electromagnetic structure coupled to at least a portion of the sensor substrate. The at least one sensor electromagnetic structure includes at least one sensor conducting sub-component. The at least one sensor electromagnetic structure is configured to regulate electromagnetic fields incident thereto in response to at least one measurement characteristic of a machine measurand. The sensor subsystem is configured to obtain at least one measurement characteristic of the machine measurand proximate a machine sensing position.

In a further aspect, a method of operating a machine including a monitoring system is provided. The machine includes a first machine substrate and a second machine substrate. The method includes regulating, with a reader subsystem, an electromagnetic field proximate a sensor subsystem, thereby illuminating a sensor conducting sub-component with the electromagnetic field. The method also includes regulating the electromagnetic field with the sensor subsystem in response to changes of at least one measurement characteristic of a machine measurand as determined through a sensor substrate integral with the first machine substrate. The method further includes sensing changes in the regulated electromagnetic field at the reader subsystem. The method also includes reflecting signals representative of the changes in the regulated electromagnetic field to a reader processor.

In another aspect, a turbomachine is provided. The turbomachine includes a first component including a first machine substrate and a second component including a second machine substrate. The second component is proximate the first component. The turbomachine also includes a monitoring system including a sensor subsystem including a sensor substrate integral with the first machine substrate and at least one sensor electromagnetic structure coupled to at least a portion of the sensor substrate. The at least one sensor electromagnetic structure includes at least one sensor conducting sub-component. The at least one sensor electromagnetic structure is configured to regulate electromagnetic fields incident thereto in response to at least one measurement characteristic of a machine measurand. The sensor subsystem is configured to obtain at least one measurement characteristic of the machine measurand proximate a machine sensing position.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner.

Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The integrated sensors and associated sensing systems described herein facilitate extended operation in harsh environments. Specifically, integrating a significant portion of sensing system components in high-temperature and rotatable components during the manufacture of such components reduces the amount of time and resources expended in preparing the high-temperature and rotatable components for insertion into the respective turbomachine after they are manufactured. Further, specifically, the integrated sensors and associated sensing systems described herein include substrate materials and dielectric materials integrated as part of the sensors such that the sensors may be positioned on components, or portions of component, that do not have sufficient substrate and dielectric materials to accept known sensors. Such integration of the sensors with the components includes adding the necessary substrate and/or dielectric materials to the sensors as sensing device features to facilitate placement of the sensors in regions that would otherwise frustrate use of such sensors thereon. Therefore, such integration of the sensors and components facilitates placing the sensors at the most appropriate and desired positions on the components. Further, such integration of the sensors and high-temperature and rotatable components will increase the hurdles to non-OEM (original equipment manufacturer) entities for attempted duplication.

Figure 1:
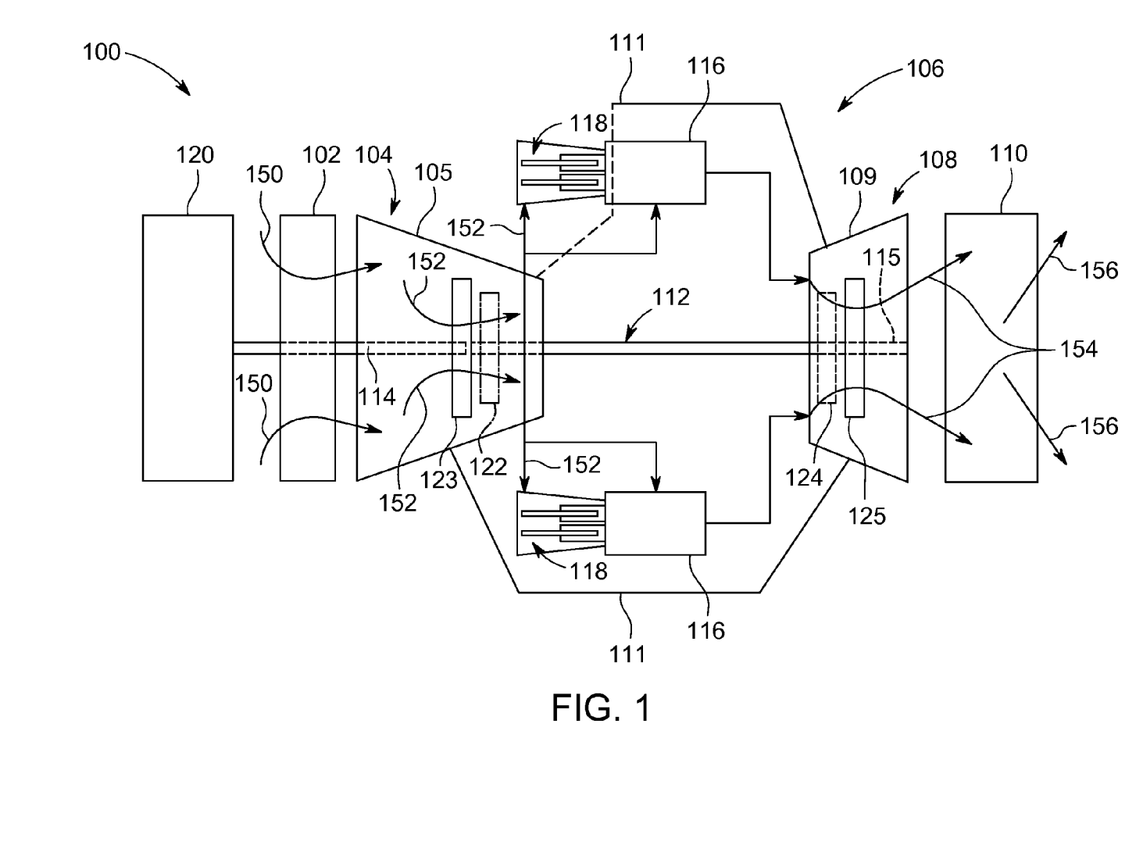
FIG. 1 is schematic diagram of an exemplary turbomachine, i.e., a gas turbine engine.

FIG. 1 is a schematic view of a rotary machine 100, i.e., a turbomachine, and more specifically, a turbine engine. In the exemplary embodiment, turbine engine 100 is a gas turbine engine. Alternatively, turbine engine 100 is any other turbine engine and/or rotary machine, including, without limitation, a steam turbine engine, an aircraft engine, a wind turbine, and a compressor. In the exemplary embodiment, gas turbine engine 100 includes an air intake section 102, and a compressor section 104 that is coupled downstream from, and in flow communication with, intake section 102. Compressor section 104 is enclosed within a compressor casing 105. A combustor section 106 is coupled downstream from, and in flow communication with, compressor section 104, and a turbine section 108 is coupled downstream from, and in flow communication with, combustor section 106. Turbine engine 100 is enclosed within a turbine casing 109 and includes an exhaust section 110 that is downstream from turbine section 108. A combustor housing 111 extends about combustor section 106 and is coupled to compressor casing 105 and turbine casing 109. Moreover, in the exemplary embodiment, turbine section 108 is coupled to compressor section 104 via a rotor assembly 112 that includes, without limitation, a compressor rotor, or drive shaft 114 and a turbine rotor, or drive shaft 115.

In the exemplary embodiment, combustor section 106 includes a plurality of combustor assemblies, i.e., combustors 116 that are each coupled in flow communication with compressor section 104. Combustor section 106 also includes at least one fuel nozzle assembly 118. Each combustor 116 is in flow communication with at least one fuel nozzle assembly 118. Moreover, in the exemplary embodiment, turbine section 108 and compressor section 104 are rotatably coupled to a load 120 via drive shaft 114. For example, load 120 may include, without limitation, an electrical generator and/or a mechanical drive application, e.g., a pump. Alternatively, gas turbine engine 100 may be an aircraft engine. In the exemplary embodiment, compressor section 104 includes at least one compressor blade assembly 122, i.e., blade 122 and at least one adjacent stationary vane assembly 123.

Also, in the exemplary embodiment, turbine section 108 includes at least one turbine blade assembly, i.e., bucket 124 and at least one adjacent stationary nozzle assembly 125. Each compressor blade assembly 122 and each turbine bucket 124 is coupled to rotor assembly 112, or, more specifically, compressor drive shaft 114 and turbine drive shaft 115.

In operation, air intake section 102 channels air 150 towards compressor section 104. Compressor section 104 compresses inlet air 150 to higher pressures and temperatures prior to discharging compressed air 152 towards combustor section 106. Compressed air 152 is channeled to fuel nozzle assembly 118, mixed with fuel (not shown), and burned within each combustor 116 to generate combustion gases 154 that are channeled downstream towards turbine section 108. Combustion gases 154 generated within combustors 116 are channeled downstream towards turbine section 108. After impinging turbine bucket 124, thermal energy is converted to mechanical rotational energy that is used to drive rotor assembly 112. Turbine section 108 drives compressor section 104 and/or load 120 via drive shafts 114 and 115, and exhaust gases 156 are discharged through exhaust section 110 to ambient atmosphere.

Figure 2:
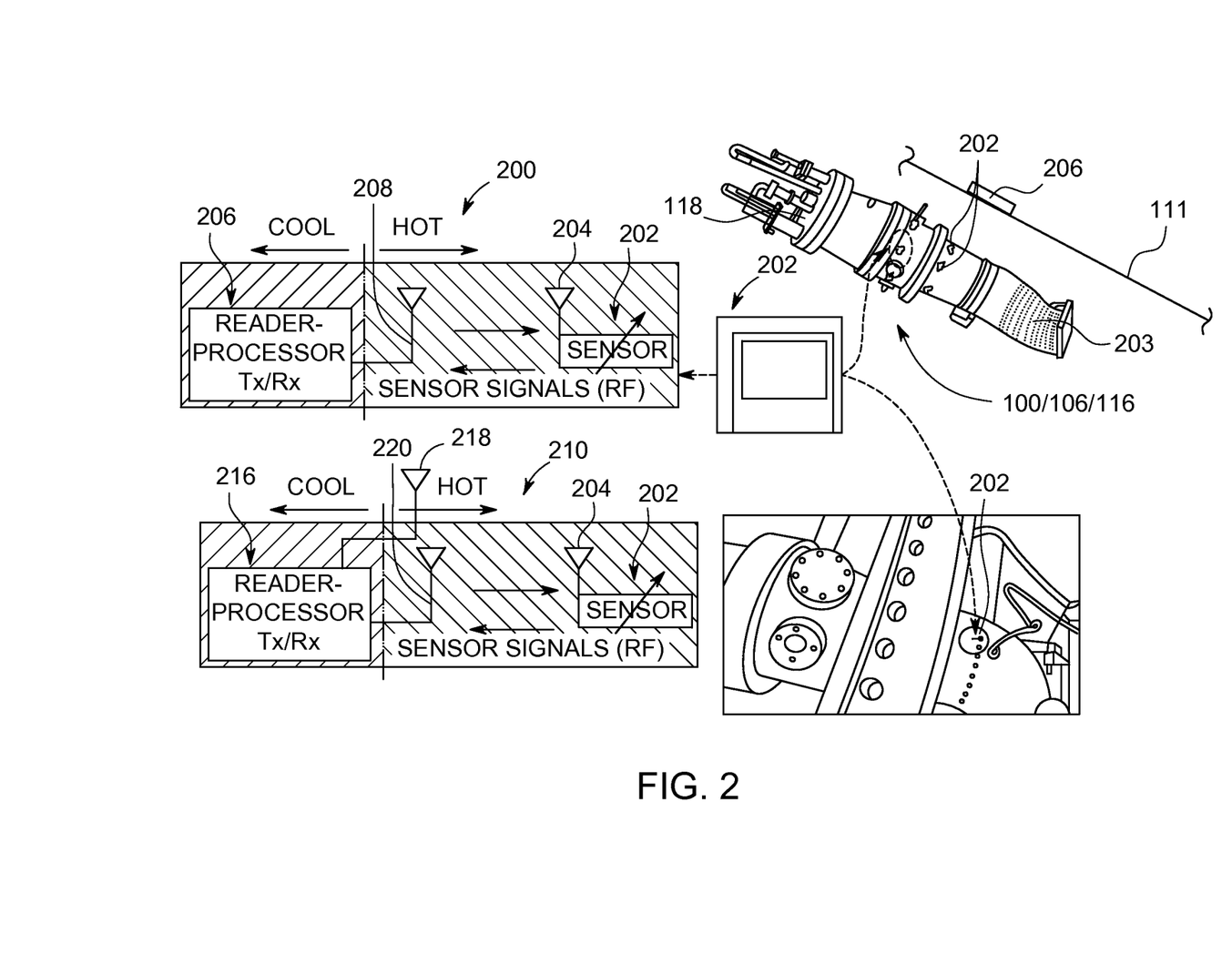
FIG. 2 is a schematic view of an exemplary monitoring system that may be used with the gas turbine engine shown in FIG. 1.

FIG. 2 is a schematic view of an exemplary monitoring system 200 that may be used with gas turbine engine 100. In the exemplary embodiment, monitoring system 200 includes at least one sensor subsystem 202 coupled to one or more combustors 116 of combustor section 106. Alternatively, monitoring system 200 includes at least one sensor subsystem 202 coupled to one or more transition pieces 203 of combustor section 106. In the exemplary embodiment, sensor subsystem 202 is a layered sensing device positioned, i.e., deposited on planar and non-planar metallic surfaces without any thermal barrier coating (TBC) materials deposited thereon. Such sensor subsystems 202 are deposited using deposition processes such as, and without limitation, plasma-based thermal spraying (discussed further below) and sputtering. Such layered formation of sensor subsystem 202 is contrasted with other placement and coupling process of sensor subsystems 202, e.g., and without limitation, printed three-dimensional, i.e., additive manufacturing and affixing through high-temperature adhesives. Alternatively, in some embodiments, sensor subsystem 202 is at least partially manufactured through additive manufacturing and coupled to combustors 116 through additional manufacturing steps as described further below. In addition, and as discussed further below, the substrate (not shown in FIG. 2) of sensor subsystem 202 is deposited with the substrate (not shown in FIG. 2) for combustor 116 from high-temperature materials that include, without limitation, Haynes® 188, Nimonic® 263, Hastelloy® X, and 309 stainless steel. Sensor subsystem 202 is configured to withstand substantially constant exposure to a harsh environment, such harsh environment may include, without limitation, high-temperatures in excess of 260 degrees Celsius (° C.) (500 degrees Fahrenheit (° F.)) and the standard vibrational conditions associated with gas turbine engines.

Also, in the exemplary embodiment, each sensor subsystem 202 includes a mechanism that facilitates providing each sensor subsystem 202 with a unique identifier such that unique identification of each combustor 116 is facilitated through associated sensor subsystem 202 coupled thereto. Moreover, sensor subsystem 202 is passive, i.e., it includes no on-board power supplies and is in a dormant condition until it is illuminated as described below. Each sensor subsystem 202 includes a radio frequency (RF) sensor antenna device 204 (discussed further below).

Further, in the exemplary embodiment, monitoring system 200 includes a reader subsystem 206. Reader subsystem 206 is coupled to a stationary portion of gas turbine engine 100, e.g., and without limitation, combustor housing 111 that is fabricated from materials that include, without limitation, cast iron. In the exemplary embodiment, reader subsystem 206 is formed and manufactured in a manner similar to that for sensor subsystem 202 as described above. More specifically, reader subsystem 206 is formed and positioned within combustor housing 111 such that reader subsystem 206 is a layered sensing device positioned, i.e., deposited on planar and non-planar metallic surfaces without any thermal barrier coating (TBC) materials deposited thereon. Such reader subsystems 206 are deposited using deposition processes such as, and without limitation, plasma-based thermal spraying (discussed further below) and sputtering.

In addition, and as discussed further below, the substrate (not shown in FIG. 2) of reader subsystem 206 is deposited with the substrate (not shown in FIG. 2) for combustor housing 111 from high-temperature materials that include, without limitation, cast iron. Alternatively, any method of integrally forming the substrates of combustor housing 111 and reader subsystem 206 is used that enables operation of reader subsystem 206, monitoring system 200, and gas turbine engine 100 as described herein including, without limitation, additional manufacturing steps subsequent to forming combustor housing 111. Such additional manufacturing steps include, without limitation, electrical and molecular bonding through applying a predetermined strain to the substrate for reader subsystem 206 over a predetermined period of time, where the substrate and combustor housing 111 are formed from the same material such that upon completion of forming reader subsystem 206, there is substantially no differentiation between the substrate and combustor housing 111. Reader subsystem 206 is configured to withstand substantially constant exposure to a harsh environment, such harsh environment may include, without limitation, high-temperature environments in excess of 100° C. (212° F.) and the standard vibrational conditions associated with gas turbine engines.

Figure 3:
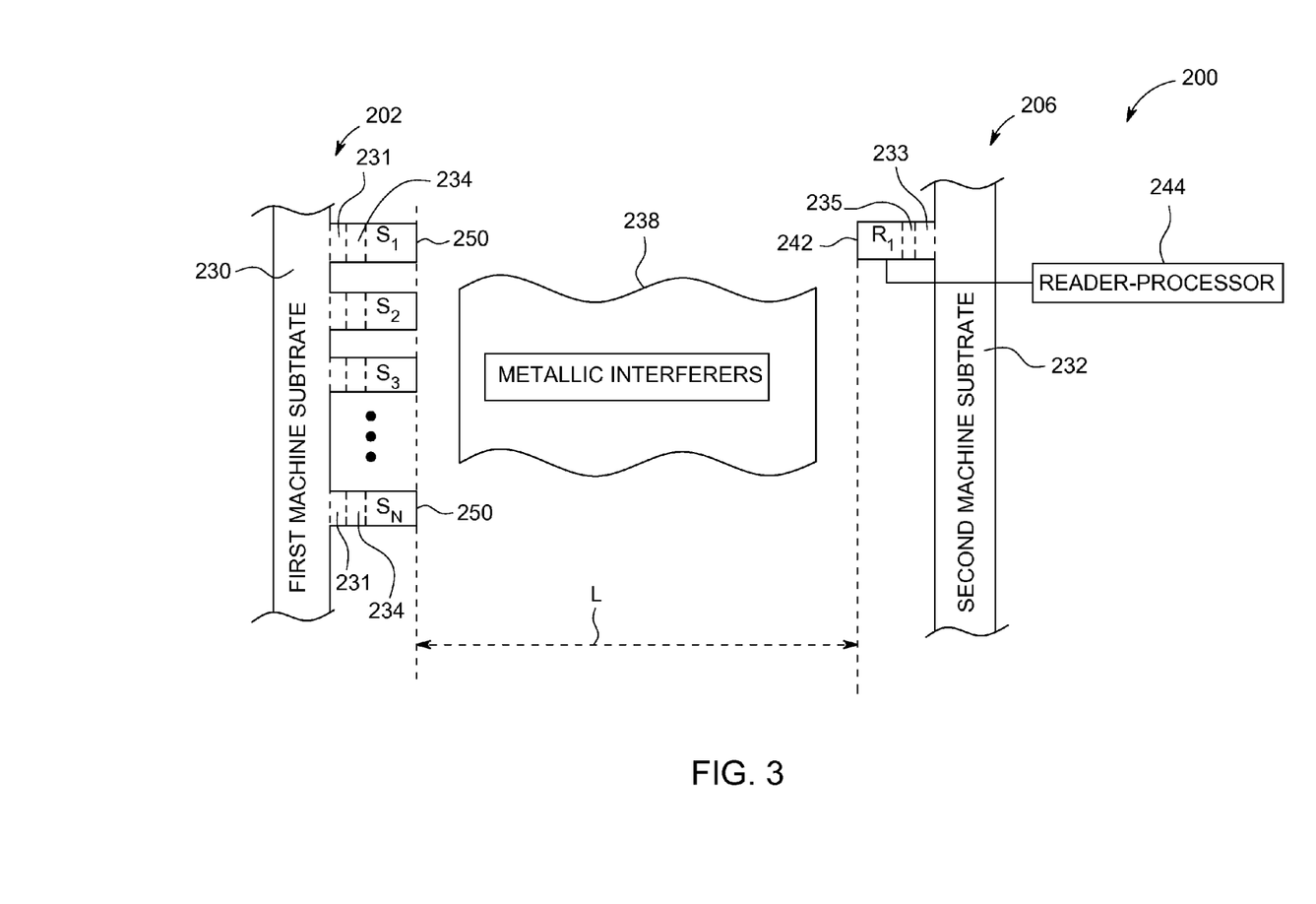
FIG. 3 is a schematic view of the monitoring system shown in FIG. 2.

Reader subsystem 206 includes a monostatic RF reader antenna device 208 (discussed further below) that facilitates transceiver functionality. Alternative embodiments, e.g., and without limitation, alternative monitoring system 210 includes an alternative reader subsystem 216 with a first bistatic reader antenna, i.e., a RF transmitter antenna 218 and a second bistatic reader antenna, i.e., a RF receiver antenna 220 (only the monostatic RF reader antenna device embodiment is shown in FIG. 3).

In addition to such stationary components as those associated with combustor section 106 that will not receive a dielectric such as a TBC, alternative embodiments of monitoring system 200 includes at least one sensor subsystem 202 coupled to one of compressor blade 122 and turbine bucket 124 (both shown in FIG. 1). In the exemplary embodiment, sensor subsystem 202 is a layered sensing device positioned on non-planar metallic surfaces without any TBC materials deposited thereon using deposition processes, e.g., and without limitation, plasma-based thermal spraying (discussed further below) and sputtering.

For example, and as discussed further below, the substrate (not shown in FIG. 2) of sensor subsystem 202 is deposited with the substrate (not shown in FIG. 2) for turbine bucket 124 from high-temperature materials that include, without limitation, U500, U700, IN738, and GTD111. Such layered formation of sensor subsystem 202 is contrasted with other placement and coupling process of sensor subsystems 202, e.g., and without limitation, printed three-dimensional, i.e., additive manufacturing and affixing through high-temperature adhesives. Alternatively, in some embodiments, sensor subsystem 202 is at least partially manufactured through additive manufacturing and coupled to combustors 116 through additional manufacturing steps as described further below. Sensor subsystem 202 is configured to withstand substantially constant exposure to a harsh environment, such harsh environment may include, without limitation, high-temperature compressed air in excess of 100° C. (212° F.), high-temperature combustion gases in excess of 260° C. (500° F.), and significant rotational forces induces by rotational velocities of in excess of approximately 7000 revolutions per minute (rpm).

Also, in this alternative embodiment, each sensor subsystem 202 includes a mechanism that facilitates providing each sensor subsystem 202 with a unique identifier such that unique identification of each compressor blade 122 and each turbine bucket 124 is facilitated through associated sensor subsystem 202 coupled thereto. Moreover, sensor subsystem 202 is passive, i.e., it includes no on-board power supplies and is in a dormant condition until it is illuminated as described below. Each sensor subsystem 202 includes a radio frequency (RF) sensor antenna device 204 (discussed further below).

Further, in this alternative embodiment, monitoring system 200 includes a reader subsystem 206. Reader subsystem 206 is coupled to a stationary portion of gas turbine engine 100, e.g., and without limitation, combustor housing 111 (shown in FIG. 1). In the exemplary embodiment, reader subsystem 206 is formed and manufactured in a manner substantially similar to that for sensor subsystem 202 as described above. Reader subsystem 206 is configured to withstand substantially constant exposure to a harsh environment, such harsh environment may include, without limitation, high-temperature environments in excess of 100° C. (212° F.) and the standard vibrational conditions associated with gas turbine engines. Materials used for fabricating combustor housing 111 include, without limitation, cast iron. Reader subsystem 206 includes a monostatic RF reader antenna device 208 (discussed further below) that facilitates transceiver functionality. Alternative embodiments, e.g., and without limitation, alternative monitoring system 210 includes and alternative reader subsystem 216 with a first bistatic reader antenna, i.e., RF transmitter antenna 218 and a second bistatic reader antenna, i.e., RF receiver antenna 220.

FIG. 3 is a schematic view of monitoring system 200 for use with gas turbine engine 100 (shown in FIGS. 1 and 2). As described above, monitoring system 200 includes a sensor subsystem 202 and a reader subsystem 206 operatively in wireless communication with each other. Gas turbine engine 100 includes a plurality of machine substrates, i.e., a first, or combustor substrate 230 including an integrated sensor substrate 231 that is formed, i.e., fabricated with combustor substrate 230. As discussed further below, sensor substrate 231 of sensor subsystem 202 is deposited with combustor substrate 230 for one of combustors 116 (shown in FIGS. 1 and 2) from high-temperature materials that include, without limitation, Haynes® 188, Nimonic® 263, Hastelloy® X, and 309 stainless steel.

Similarly, gas turbine engine 100 includes a second, or combustor housing substrate 232 including an integrated reader substrate 233 that is formed, i.e., fabricated with combustor housing substrate 232. Also, as discussed further below, reader substrate 233 of reader subsystem 206 is deposited with reader substrate 232 for combustor housing 111 (shown in FIGS. 1 and 2) from materials that include, without limitation, cast iron.

Alternatively, substrates 230, 231, 232, and 233 are formed from any materials that enable operation of monitoring system 200 and gas turbine engine 100 as described herein, including one or more of, and without limitation, any electrically conductive material, a metal, a carbon fiber, a metal of high magnetic permeability, a metal matrix composite, a ceramic matrix composite, and a cermet.

Substrates 230, 231, 232, and 233 are maintained at substantially ground potential. As such, substrates 230, 231, 232, and 233 are integral to gas turbine engine 100, and therefore, sensor subsystem 202 and reader subsystem 206 are integral to gas turbine engine 100, i.e., specifically, combustor 116 and combustor housing 111, respectively. In alternative embodiments, first machine substrate 230 is a portion of any translational component of any machine and second machine substrate 232 is a portion of any stationary component of any machine.

Sensor subsystem 202 also includes a sensor dielectric layer 234 formed over a least a portion of sensor substrate 231. In the exemplary embodiment, sensor dielectric layer 234 is a thermal barrier coating (TBC) including, without limitation, one or more of yttria-stabilized zirconia, a high-temperature ceramic material, alumina, aluminum oxide, forsterite, spinel, mullite, corderite, glass, silicon dioxide, and barium strontium titanate. Also, in the exemplary embodiment, sensor dielectric layer 234 facilitates electrically isolating additional components of sensor subsystem 202 (discussed further below) from combustor substrate 230 (at ground potential) and to represent a change in a measured characteristic of a measurand associated with combustors 116. As described above, combustors 116 typically do not have a TBC that can function as a machine dielectric. Therefore, sensor dielectric layer 234 is necessary for such electrical isolation.

As used herein, the term "measurand" refers to a quantity, a quality, a characteristic, and a condition being measured. In the exemplary embodiment, measurands include one or more of, without limitation, temperature, strain, cracking, creep, a hot spot, equipment condition (e.g., off or on), metal temperature, and temperature and condition of sensor dielectric 234. Also, as used herein, the term "measurement characteristics" refers to a monitored value or a change of the monitored value of sensor dielectric 234, including one or more of, and without limitation, impedance, a dielectric constant, an electrical resistance, capacitance, inductance, impedance, reactance, geometrical parameters, a reflection coefficient, a transmission coefficient, a dissipation factor, a coupling parameter, a gain, a resonant frequency, and a resonant frequency shift.

Therefore, in the exemplary embodiment, sensor dielectric 234 is one or more of, and without limitation, a tunable dielectric, a temperature dependent dielectric, a voltage dependent dielectric, and a dielectric with its dissipation characteristics dependent upon temperature.

Sensor subsystem 202 further includes at least one sensor subassembly, i.e., sensor electromagnetic structure 250. In the exemplary embodiment, a plurality of sensor electromagnetic structures 250 are positioned, i.e., deposited at predetermined sensing locations on first machine substrate 230. Sensor electromagnetic structures 250 obtain the predetermined measurement characteristics in response to the predetermined measurands at the sensing positions. In the exemplary embodiment, there are N sensor electromagnetic structures 250 labeled $S_1$ through $S_N$. Each of sensor electromagnetic structures 250 $S_1$ through $S_N$ is coupled to and extends over a respective dielectric layer 234 that is coupled to and extends over a respective sensor substrate layer 231.

A plurality of metallic interferers 238 are positioned proximate to and between sensor subsystem 202 and reader subsystem 206. Metallic interferers 238 include, without limitation, those objects and features typically found in gas turbine engines such as engine 100. Monitoring system 200 is configured to take into account the signal interference features and characteristics of metallic interferers 238, e.g., and without limitation, known wireless signal reflections and interferences. Such metallic interferers 238 include, without limitation, nozzle assemblies 125 (shown in FIG. 1). In addition, monitoring system 200 is configured to take into account the signal interference features and characteristics of other configuration artifacts and features of engine 100, e.g., and without limitation, cavities defined therein.

In the exemplary embodiment, reader subsystem 206 includes a portion of combustor housing substrate 232. Reader subsystem 206 also includes a reader dielectric layer 235 coupled to and extending over a portion of reader substrate 232. Reader subsystem 206 further includes at least one reader electromagnetic (EM) subassembly 242 coupled to and extending over reader dielectric layer 235. Reader subsystem 206 also includes a reader processor 244 coupled to reader EM subassembly 242. Reader processor 244 is configured to determine values for the measurement characteristics of the machine measurand.

Also, in the exemplary embodiment, sensor electromagnetic structures 250 are communicatively coupled with reader EM subassembly 242 with a separation L therebetween in a range between about 10 centimeters (cm) and about 125 cm. Alternatively, separation L extends from near-field to far-field electromagnetic range, i.e., within the range from about 2 wavelengths to about 5 wavelengths.

Figure 4:
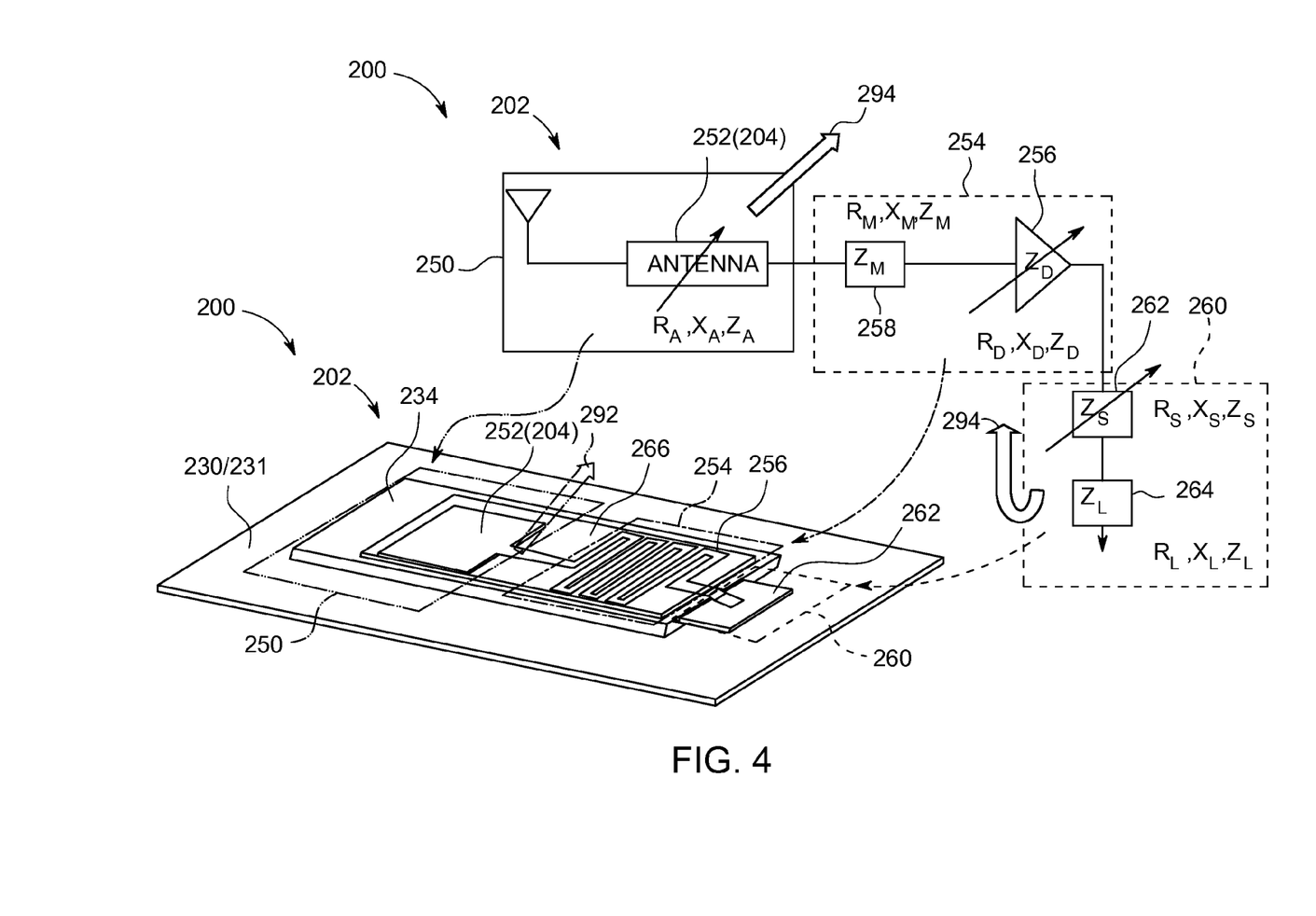
FIG. 4 is a schematic view and a perspective view of an exemplary sensor subsystem that may be used with the monitoring system shown in FIGS. 2 and 3.

FIG. 4 is a schematic view and a perspective view of sensor subsystem 202 that may be used with monitoring system 200. Sensor subsystem 202 includes sensor substrate 231 and sensor dielectric later 254 coupled to and extending over a portion of sensor substrate 231. Sensor subsystem 202 also includes a sensor electromagnetic (EM) structure 250. Sensor EM structure 250 is disposed on sensor dielectric layer 234 and includes at least one sensor conducting subcomponent 252 (only one shown) that is configured to regulate electromagnetic fields incident thereto (typically from reader EM subassembly 242 (shown in FIG. 3)) in response to at least one measurement characteristic of the machine measurand. Sensor conducting subcomponent 252 is a high-conductivity, low-resistivity device. As such, sensor subsystem 202 is configured to obtain at least one measurement characteristic of the machine measurand proximate the machine sensing position. Sensor conducting subcomponent 252 is formed from materials, including one or more of, without limitation, an electromagnetic energy radiating element, a rectangular microstrip antenna, a patch antenna, a monopole antenna, a planar inverted-F antenna, a quarter-wavelength patch, a dipole antenna, and a spiral antenna. As such, sensor conducting subcomponent 252 is an electromagnetic field-responsive component configured to radiate in close proximity of sensor substrate 231 (that is integrally formed with combustor substrate 230). More specifically, sensor conducting subcomponent 252 acts as an antenna 204 (shown in FIG. 3) configured to be responsive to RF fields, i.e., radiate, receive, and reflect RF fields. Therefore, sensor EM structure 250 has an antenna resistance ($R_A$), an antenna impedance ($X_A$), and an antenna reactance ($Z_A$). While sensor subsystem 202 as shown and described herein includes additional components coupled to sensor EM structure 250, as discussed further below, sensor subsystem 202 with sensor EM structure 250 by itself is sufficient to enable operation of sensor subsystem 202 as described herein.

In the exemplary embodiment, sensor conducting subcomponent 252 is formed from materials that include, without limitation, an electrically conductive material, an electrically conductive layer, an electrically conductive stack, a metal, a high temperature conductor, a platinum layer, and a palladium layer.

Sensor subsystem 202 also includes an optional delay component 254 (shown in phantom) coupled to sensor EM structure 250. Delay component 254 is disposed on dielectric layer 234 and includes at least one sensor conducting subcomponent 256 (only one shown) that is configured to regulate electromagnetic fields incident thereto in response to at least one measurement characteristic of the machine measurand. Sensor conducting subcomponent 256 is coupled to sensor conducting subcomponent 252. Also, sensor conducting subcomponent 256 is an electromagnetic field-responsive component configured to radiate in close proximity of bucket substrate 230. As such, sensor conducting subcomponent 256 facilitates sensor subsystem 202 obtaining at least one measurement characteristic of the machine measurand proximate the machine sensing position. Sensor conducting subcomponent 256 is formed from materials substantially similar to those of sensor conducting subcomponent 252. Sensor conducting subcomponent 256 differs from sensor conducting subcomponent 252 in that while subcomponent 252 is substantially rectangular, subcomponent 256 is relatively narrow and is configured with a winding path to facilitate delaying electric current transmitted therethrough. Sensor conducting subcomponent 256 has a delay resistance ($R_D$), a delay impedance ($X_D$), and a delay reactance ($Z_D$). Delay component 254 also includes a matching element 258 that facilitates matching impedances between sensor EM structure 250 and delay component 254. Matching element 258 has a matching resistance ($R_M$), a matching impedance ($X_M$), and a matching reactance ($Z_M$). Matching element 258 includes, without limitation, a T-match, an inductively coupled loop, a nested slot, a resistor, a capacitor, an inductor, and a reactive element.

Sensor subsystem 202 further includes an optional sensor component 260 (shown in phantom) coupled to delay component 254. Sensor component 260 is configured to reflect a regulated RF field back toward reader EM subassembly 242. Sensor component 260 is disposed on bucket substrate 230 and includes a sensor element 262. Sensor element 262 is a low-conductivity, high-resistivity device coupled to sensor conducting subcomponent 256. Sensor element 262 is configured to regulate electromagnetic fields incident thereto in response to at least one measurement characteristic of the machine measurand. Also, sensor element 262 is an electromagnetic field-responsive component configured to radiate in close proximity of bucket substrate 230. As such, sensor element 262 facilitates sensor subsystem 202 obtaining at least one measurement characteristic of the machine measurand proximate the machine sensing position. Sensor element 262 has a sensor resistance ($R_S$), a sensor impedance ($X_S$), and a sensor reactance ($Z_S$). Sensor element 262 is formed from low-conductivity, high-resistivity materials, including one or more of, without limitation, nickel, indium tin oxide, and barium strontium titanate.

Sensor component 260 also includes a loading element 264 representative the effective sum of loads the RF field will interact with in sensor subsystem 202. Loading element 264 has an effective load resistance ($R_L$), an effective load impedance ($X_L$), and an effective load reactance ($Z_L$). The components that may be included in the effective sums include, without limitation, and in any combination of series and parallel, a modulating block, an impedance, a switch, a passive component, a resistive element, a capacitive element, an inductive element, and a reactive element.

As described above, matching element 258 facilitates matching impedances between sensor EM structure 250 and delay component 254. In addition, for those embodiments that do not include a sensor conducting subcomponent 256, matching element 258 facilitates matching impedances between sensor EM structure 250 and loading element 264.

Sensor element 262 and loading element 264 are shown in FIG. 4 as coupled in series. Alternatively, sensor element 262 and loading element 264 are coupled in parallel. Also, delay component 254 and sensor component 260 are shown in FIG. 4 as separate components. Alternatively, delay component 254 and sensor component 260 are combined into a single component.

In the exemplary embodiment, sensor component 260 does not include sensor dielectric layer 234. In some embodiments, sensor component 260 includes a reference dielectric sub-component. The reference dielectric sub-component operates in a manner similar to sensor dielectric layer 234. The reference dielectric sub-component is formed from materials that include, without limitation, yttria-stabilized zirconia, a high-temperature ceramic material, alumina, aluminum oxide, forsterite, spinel, mullite, corderite, glass, silicon dioxide, barium strontium titanate, a tunable dielectric, temperature driven dielectric, and voltage dependent dielectric, where the associated dielectric loss is dependent upon temperature.

As described above, sensor conducting subcomponent 252, sensor conducting subcomponent 256, and sensor element 262 are configured to regulate electromagnetic fields incident thereto in response to at least one measurement characteristic of the machine measurand. Also, sensor conducting subcomponent 252, sensor conducting subcomponent 256, and sensor element 262 are electromagnetic field-responsive components configured to radiate in close proximity of sensor substrate 231. As such, sensor conducting subcomponent 252, sensor conducting subcomponent 256, and sensor element 262 facilitate sensor subsystem 202 obtaining at least one measurement characteristic of the machine measurand proximate the machine sensing position. In addition, sensor conducting subcomponent 252, sensor conducting subcomponent 256, and sensor element 262 are configured to obtain reference characteristics insensitive to the measurand of combustor 116. The purpose of obtaining such reference characteristics includes capturing known noise and interference effects that also vary. Such reference characteristics are typically not sensitive to variations in the measurement characteristics of the measurands, but are sensitive to noise and interference variations. Once the noise and interference variations are captured, an associated predetermined variance associated with those noise and interference variations are applied to the measurement characteristics collected to remove the noise and interference variations. Such reference characteristics include, without limitation, impedances, impedance changes, geometrical parameters, coupling parameters, dielectric constants, gains, resonant frequencies, resonant frequency shifts, dielectric constants, resistances, capacitances, inductances, reflection coefficients, transmission coefficients, and dissipation factors.

Further, in the exemplary embodiment, sensor subsystem 202 includes a passivation subcomponent 266 configured to protect sensor EM structure 250 and delay component 254 from the remainder of machinery and environmental influences from gas turbine engine 100, including, without limitation, oxidation and reduction reactions associated with combustor substrate 230 and sensor substrate 231. Passivation subcomponent 266 is formed from materials that include, without limitation, yttria-stabilized zirconia, a high-temperature ceramic, alumina, aluminum oxide, forsterite, spinel, mullite, corderite, glass, silicon dioxide, barium strontium titanate, a tunable dielectric, temperature dependent dielectric, voltage dependent dielectric, and a dielectric with its dissipation dependent upon temperature.

In the exemplary embodiment, during manufacturing of combustor 116, sensor subsystem 202 is embedded thereon. Specifically, sensor subsystem 202 is coupled to combustor substrate 230. More specifically, sensor substrate 231 and combustor substrate 230 are integrated, thereby integrating a significant portion of sensing system 200 components in stationary components exposed to harsh environments. As such, sensor subsystem 202 is configured to withstand substantially constant exposure to harsh environments, including, without limitation, high-temperatures in excess of 260° C. (500° F.) and the standard vibrational conditions associated with gas turbine engines. As such, the amount of time and resources expended in preparing the high-temperature components for insertion into the respective turbomachines after they are manufactured is reduced.

Also, in the exemplary embodiment, sensor subsystem 202 is a layered sensing device positioned, i.e., deposited on planar and non-planar metallic surfaces without any thermal barrier coating (TBC) materials deposited thereon. Such sensor subsystems 202 are deposited using deposition processes such as, and without limitation, plasma-based thermal spraying. As such, sensor substrate 231 is deposited with combustor substrate 230 from high-temperature materials that include, without limitation, Haynes® 188, Nimonic® 263, Hastelloy® X, and 309 stainless steel.

Once sensor substrate 231 is deposited, sensor dielectric layer 234 is formed, i.e., deposited over at least a portion of sensor substrate 231 using deposition processes such as, and without limitation, plasma-based thermal spraying. In the exemplary embodiment, sensor dielectric layer 234 is a thermal barrier coating (TBC) including, without limitation, one or more of yttria-stabilized zirconia, a high-temperature ceramic material, alumina, aluminum oxide, forsterite, spinel, mullite, corderite, glass, silicon dioxide, and barium strontium titanate.

After sensor dielectric layer 234 is deposited, passivation subcomponent 266 is formed, i.e., deposited over at least a portion of sensor dielectric layer 234 using deposition processes such as, and without limitation, plasma-based thermal spraying. Passivation subcomponent 266 is formed from materials that include, without limitation, yttria-stabilized zirconia, a high-temperature ceramic, alumina, aluminum oxide, forsterite, spinel, mullite, corderite, glass, silicon dioxide, barium strontium titanate, a tunable dielectric, temperature dependent dielectric, voltage dependent dielectric, and a dielectric with its dissipation dependent upon temperature.

Further, in the exemplary embodiment, sensor conducting subcomponents 252 and 256 including delay component 254 are formed, i.e., deposited over at least a portion of passivation subcomponent 266 using deposition processes such as, and without limitation, plasma-based thermal spraying. Sensor conducting subcomponents 252 and 256 including delay component 254 are formed from materials that include, without limitation, an electrically conductive material, an electrically conductive layer, an electrically conductive stack, a metal, a high temperature conductor, a platinum layer, and a palladium layer.

Alternatively, in some embodiments, sensor subsystem 202 is at least partially manufactured through additive manufacturing and coupled to combustors 116 through additional manufacturing steps as described further below that do not include the use of adhesives. For example, such additional manufacturing steps include, without limitation, forming a sensor substrate 231 from the same materials as combustor substrate 230 through additive manufacturing. Sensor substrate 231 is integrally merged with combustor substrate 230 through electrical and molecular bonding through applying a predetermined strain to sensor substrate 231 for a predetermined period of time. Since sensor substrate 231 and combustor substrate 230 are formed from the same material, upon completion of this step there is substantially no differentiation sensor substrate 231 and combustor substrate 230.

Further, alternatively, in some embodiments, the remaining components of sensor subsystem 202, e.g., and without limitation, sensor dielectric layer 234, passivation subcomponent 266, and sensor conducting subcomponents 252 and 256 including delay component 254 are formed through additive manufacturing individually or as a unit with sensor substrate 231 for integration with combustor substrate 230.

Figure 5:
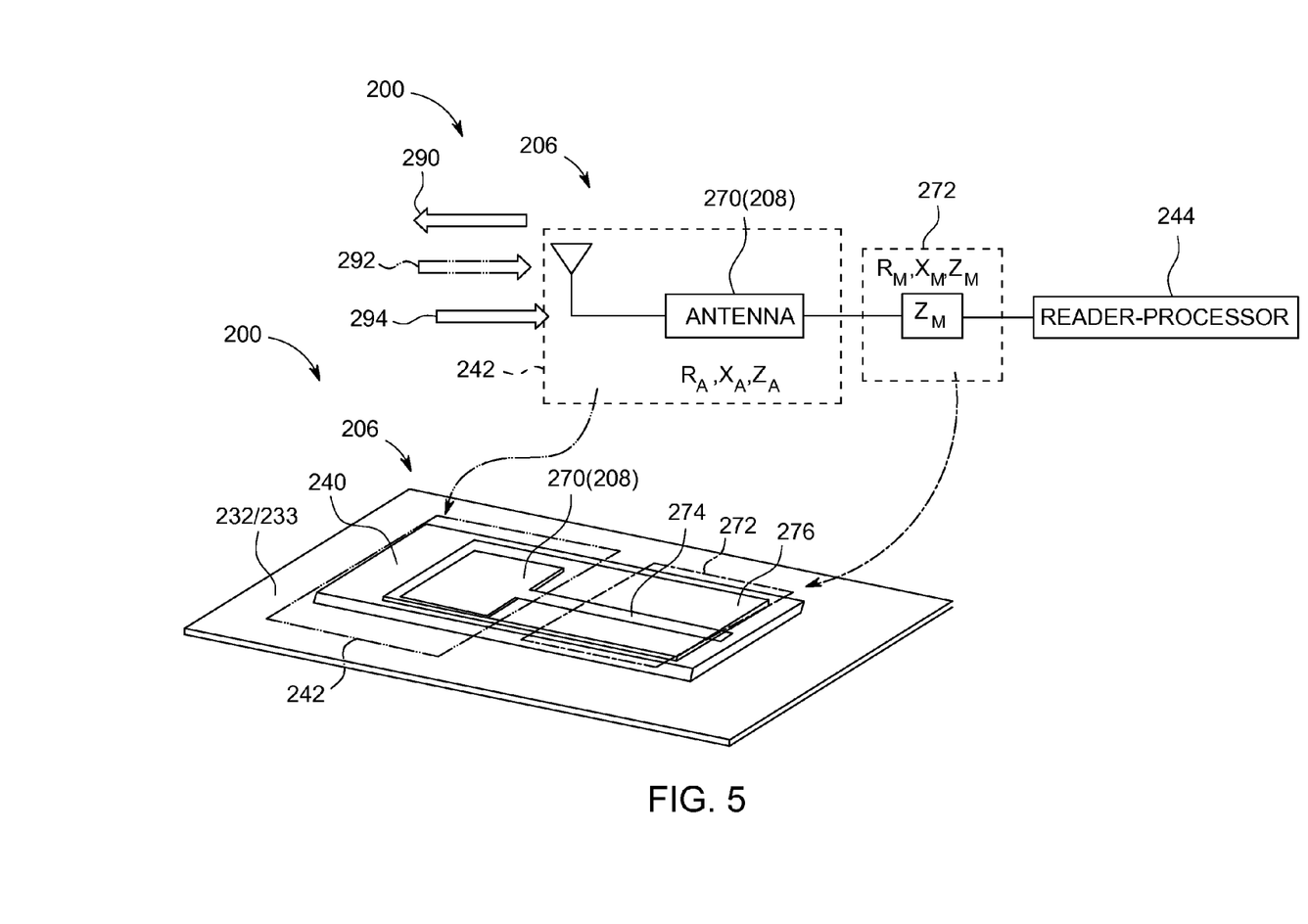
FIG. 5 is a schematic view and a perspective view of an exemplary reader subsystem that may be used with the monitoring system shown in FIGS. 2 and 3.

FIG. 5 is a schematic view and a perspective view of reader subsystem 206 that may be used with monitoring system 200. Reader subsystem 206 is operatively coupled to sensor subsystem 202 (shown in FIG. 4). Reader subsystem 206 includes reader substrate 233. Reader subsystem 206 also includes reader dielectric layer 240 coupled to and extending over a portion of casing substrate 232. Reader dielectric layer 240 is similar to machine dielectric layer 234 (shown in FIG. 4). Reader subsystem 206 further includes at least one reader electromagnetic (EM) subassembly 242 coupled to reader dielectric layer 240.

Reader EM subassembly 242 is disposed on dielectric layer 240 and includes at least one reader conducting subcomponent 270 (only one shown) that is configured to measure electromagnetic fields incident thereto (typically from sensor component 260 or sensor EM structure 250 (both shown in FIG. 4)). Reader EM subassembly 242 is also configured to illuminate sensor subsystem 202 with an RF field. Therefore, reader conducting subcomponent 270 acts as an antenna configured to radiate and receive RF fields. As such, reader conducting subcomponent 270 acts as antenna 208 (shown in FIG. 2). Reader conducting subcomponent 270 is formed from materials similar to those for sensor conducting subcomponent 256. Reader EM structure 242 has an antenna resistance ($R_A$), an antenna impedance ($X_A$), and an antenna reactance ($Z_A$).

Reader conducting subcomponent 270 is illuminated with modified time varying electromagnetic (RF) fields including properties such as, without limitation, a return signal strength, a return signal phase, a return signal timing characteristics, a timing delay, a resonant frequency, a resonant frequency shift, polarization, reflection coefficient, backscatter ratio, radar cross section, and absorption. As used herein, "illuminating", "illuminate", and illuminated" refer to exposing an object to EM/RF fields through means that include, without limitation, direct line of sight and one or more reflections, including, without limitation, around corners and proximate interferers as described above.

Reader subsystem 206 also includes a matching element 272 that facilitates matching impedances between reader conducting subcomponent 270 and reader processor 244. Matching element 272 is similar to matching element 258 (shown in FIG. 4) and has a matching resistance ($R_M$), a matching impedance ($X_M$), and a matching reactance ($Z_M$).

Reader subsystem 206 also includes reader processor 244 coupled to matching element 272. Reader processor 244 determines values for the measurement characteristics of the machine measurand based on at least one property of the regulated electromagnetic fields as described above. More specifically, reader processor 244 determines the measurand of sensor substrate 231 independent of error sources including, without limitation, power level shifts, reader power shifts, ambient temperature, ambient moisture, and changes to conditions external to the operation of the equipment. Matching element 272 includes a conducting subcomponent 274 coupled to, and similar to, reader conducting subcomponent 270. Reader subsystem 206 also includes a passivation subcomponent 276 similar to passivation subcomponent 266 (shown in FIG. 4).

In the exemplary embodiment, during manufacturing of combustor housing 11, reader subsystem 206 is embedded thereon. Specifically, reader subsystem 206 is coupled to combustor housing substrate 232. More specifically, reader substrate 233 and combustor housing substrate 232 are integrated, thereby integrating a significant portion of monitoring subsystem 200 components in stationary components exposed to harsh environments. As such, reader subsystem 206 is configured to withstand substantially constant exposure to a harsh environment, such harsh environment may include, without limitation, high-temperature environments in excess of 100° C. (212° F.) and the standard vibrational conditions associated with gas turbine engines. Materials used for fabricating combustor housing 111 include, without limitation, cast iron. As such, the amount of time and resources expended in preparing the high-temperature components for insertion into the respective turbomachines after they are manufactured is reduced.

Also, in the exemplary embodiment, reader subsystem 206 is a layered sensing device positioned, i.e., deposited on planar and non-planar metallic surfaces without any thermal barrier coating (TBC) materials deposited thereon. Such reader subsystems 206 are manufactured and integrated with combustor housing substrate 232 in a manner substantially similar to that for sensor subsystem 202 as described above.

Referring to FIGS. 2, 3, 4, and 5, in operation of gas turbine engine 100 and monitoring system 200, reader subsystem 206 generates an electromagnetic field 290 in a predetermined portion of the RF spectrum proximate sensor subsystem 202, thereby illuminating sensor conducting subcomponent 252 with electromagnetic field 290. Specifically, reader processor 244 (or, any other controller) commands reader conducting subcomponent 270 to energize and to operate reader EM subassembly 242 as a radiating antenna. Reader EM subassembly 242 illuminates sensor conducting subcomponent 252 and sensor EM structure 250 operates as an antenna.

In the exemplary embodiment, electromagnetic field 290 is generated as a series of pulses with a predetermined frequency within a predetermined wideband range of the RF frequency spectrum, the wideband range of the RF frequency spectrum including predetermined resonant frequencies of sensor subsystem 202. Alternatively, electromagnetic field 290 is generated with time-varying frequencies that sweep through a range of frequencies that encompass predetermined resonant frequencies of sensor subsystem 202. The frequency is within the range between approximately 100 kiloHertz (kHz) and approximately 10 gigaHertz (GHz). In alternative embodiments, the frequency range extends from 3 kHz to 300 GHz.

Also, in the exemplary embodiment, electromagnetic field 290 induces fringing fields (not shown) in sensor conducting subcomponent 252 that are at least partially representative of the measured characteristic of the measurand. Specifically, these fringing fields induce a voltage between sensor conducting subcomponent 252 and substrate 230 (at ground potential) and a current in sensor conducting subcomponent 252 with a resonant frequency that is different than the frequency of electromagnetic field 290, such resonant frequency representative of the measured characteristic of the measurand. The band of resonant frequencies is narrower than the frequency range of field 290, therefore, only that portion of field 290 with frequencies close to the center frequency of the resonant frequency range excite sensor conducting subcomponent 252, the other frequencies are essentially blocked, and sensor subsystem 202 acts as a narrow band filter. Sensor dielectric layer 234 has a measurand-dependent dielectric constant that facilitates regulating the resonant frequencies and the change in the dielectric constant and/or dielectric loss due to a change in the measurand induces the corresponding change in at least one of resonant frequency, amplitude, and phase. As such, electromagnetic field 290 is regulated by sensor subsystem 202 in response to changes of at least one measurement characteristic of a machine measurand as determined through sensor dielectric layer 234 extending over a portion of sensor substrate 231.

For those embodiments with a sensor EM structure 250 and no delay component 254 and no sensor component 260, a reflected EM field 292 at the resonant frequency is sent to reader EM subassembly 242 from sensor EM structure 250.

For those embodiments with delay component 254 and sensor component 260, matching element 258 facilitates matching the impedances of sensor EM structure 250 with delay component 254 and sensor component 260 as the current is transmitted from sensor EM structure 250 to delay component 254. Also, sensor conducting subcomponent 256 facilitates sensing the change in the measurand in a manner similar to sensor conducting subcomponent 252. The signal at the resonant frequency is transmitted from sensor conducting subcomponent 256 to sensor element 262. Sensor element 262 facilitates sensing the change in the measurand in a manner similar to sensor conducting subcomponent 252 and the signal at the resonant frequency results in an electromagnetic field 294 that is reflected back to reader EM subassembly 242 from sensor component 260.

EM subassembly 242 regulates voltage and current signals that is reflected to reader processor 244 that senses the changes in the regulated electromagnetic field. Reader processor 244 includes sufficient algorithms and instructions programmed therein to process or translate signals representative of values of the at least one measurement characteristic of the machine measurand and transmit the signals representative of values of the at least one measurement characteristic to at least one of a recording device and an indicating device.

Monitoring system 200 facilitates remote monitoring for, without limitation, a condition based maintenance system, a structural monitoring program, an operational control system for the machinery, an instrumentation schema, an engineering development verification, a product verification, and hot gas path sensing.

The above-described integrated sensors and associated sensing systems facilitate extended operation in harsh environments. Specifically, integrating a significant portion of sensing system components in high-temperature and rotatable components during the manufacture of such components reduces the amount of time and resources expended in preparing the high-temperature and rotatable components for insertion into the respective turbomachine after they are manufactured. Further, specifically, the integrated sensors and associated sensing systems described herein include substrate materials and dielectric materials integrated as part of the sensors such that the sensors may be positioned on components, or portions of component, that do not have sufficient substrate and dielectric materials to accept known sensors. Such integration of the sensors with the components includes adding the necessary substrate and/or dielectric materials to the sensors as sensing device features to facilitate placement of the sensors in regions that would otherwise frustrate use of such sensors thereon. Therefore, such integration of the sensors and components facilitates placing the sensors at the most appropriate and desired positions on the components. Further, such integration of the sensors and high-temperature and rotatable components will increase the hurdles to non-OEM (original equipment manufacturer) entities for attempted duplication.

An exemplary technical effect of the methods, systems, and apparatus described herein includes at least one of: (a) integrating substrate and/or dielectric components into sensing devices to facilitate placement of such integrated devices into otherwise unacceptable regions; (b) integrating sensing system devices in components during the manufacture of such components, thereby reducing the amount of time and resources expended in preparing the components for insertion into the respective turbomachines after they are manufactured; (c) increasing the hurdles to non-OEM entities for attempted duplication; (d) facilitating placement of the sensor components at the most appropriate and desired positions on the high-temperature and rotatable components; (e) positioning sensors in harsh environments that do not have delicate chip features, thereby facilitating more robust sensing devices; (f) providing sensors that embedded within the associated components during manufacture and are not affixed to their associated components subsequent to manufacturing of those components, thereby facilitating sturdier sensing devices; and (g) facilitating passive operation of a machine sensor in a wireless environment.

Exemplary embodiments of methods, systems, and apparatus for operating turbomachines are not limited to the specific embodiments described herein, but rather, components of systems and/or steps of the methods may be utilized independently and separately from other components and/or steps described herein. For example, the methods, systems, and apparatus may also be used in combination with other systems requiring a monitoring of components in harsh environments, and the associated methods, and are not limited to practice with only the systems and methods as described herein. Rather, the exemplary embodiment can be implemented and utilized in connection with many other applications, equipment, and systems that may benefit from using passive wireless sensors tightly integrated with the components they monitor.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit any way the definition and/or meaning of the term processor.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A monitoring system for a machine, the machine including a first machine substrate and a second machine substrate, said monitoring system comprising a sensor subsystem comprising:
    a sensor substrate integral with the first machine substrate;
    a dielectric layer formed over the sensor substrate; and
    a plurality of sensor subassemblies positioned at predetermined sensing positions on the dielectric layer, wherein each of the sensor subassemblies includes at least one sensor electromagnetic structure coupled to at least a portion of said sensor substrate, said at least one sensor electromagnetic structure comprising at least one sensor conducting sub-component, said at least one sensor electromagnetic structure configured to regulate electromagnetic fields incident thereto in response to at least one measurement characteristic of a machine measurand, said sensor subsystem configured to obtain at least one measurement characteristic of the machine measurand proximate a machine sensing position.

2. The monitoring system in accordance with claim 1 further comprising a reader subsystem operatively coupled to said sensor subsystem, said reader subsystem comprising:
    a reader substrate integral with the second machine substrate; and
    at least one reader electromagnetic subassembly comprising at least one reader conducting subcomponent configured to measure the regulated electromagnetic fields; and
    a reader processor coupled to said at least one reader electromagnetic subassembly, said reader processor configured to determine values for the measurement characteristics of the machine measurand based on at least one property of the regulated electromagnetic fields.

3. The monitoring system in accordance with claim 2, wherein one or more of:
    said reader subsystem further comprises a passivation subcomponent configured to at least partially protect said reader electromagnetic subassembly from environmental conditions within the machine; and
    said at least one reader electromagnetic subassembly further comprises a reader dielectric layer formed over at least a portion of said reader substrate.

4. The monitoring system in accordance with claim 2, wherein:
    said at least one reader conducting subcomponent defines at least one reader antenna configured to transmit energy in the radio-frequency (RF) spectrum to said at least one sensor electromagnetic structure and at least one reader antenna configured to receive energy in the RF spectrum from said sensor electromagnetic structure; and
    said at least one sensor conducting subcomponent defines a sensor antenna configured to respond to the RF energy transmitted from said reader electromagnetic subassembly.

5. The monitoring system in accordance with claim 4, wherein said at least one reader antenna comprises one of:
    a first bistatic reader antenna configured to transmit energy in the RF spectrum to said at least one sensor electromagnetic structure and a second bistatic reader antenna configured to receive energy in the RF spectrum from said sensor electromagnetic structure; and
    a monostatic reader antenna configured to both transmit energy in the RF spectrum to said at least one sensor electromagnetic structure and receive energy in the RF spectrum from said sensor electromagnetic structure.

6. The monitoring system in accordance with claim 1, wherein said sensor subsystem further comprises a passivation subcomponent configured to at least partially protect said at least one sensor electromagnetic structure from environmental conditions within the machine.

7. The monitoring system in accordance with claim 1, wherein said at least one sensor subsystem further comprises:
a delay component coupled to said sensor electromagnetic structure; and
a sensor component coupled to said delay component.

8. The monitoring system in accordance with claim 7, wherein said sensor component comprises a loading element and said at least one sensor subsystem further comprises a matching element coupled to said at least one sensor electromagnetic structure and said loading element, said matching element configured to facilitate impedance matching between said loading element and said sensor electromagnetic structure.

9. The monitoring system in accordance with claim 7, wherein said sensor component is an electromagnetic field-responsive component configured to radiate in close proximity of said sensor substrate.

10. A method of operating a machine including a monitoring system, the machine including a first machine substrate and a second machine substrate, said method comprising:
generating, with a reader subsystem, an electromagnetic field proximate a sensor subsystem, thereby illuminating a sensor conducting subcomponent with the electromagnetic field, wherein the reader subsystem is printed and positioned on a non-planar metallic surface using maskless patterning and manufacturing with no electronic components embedded thereon;
regulating the electromagnetic field with the sensor subsystem in response to changes of at least one measurement characteristic of a machine measurand as determined through a sensor substrate integral with the first machine substrate;
sensing changes in the regulated electromagnetic field at the reader subsystem; and
reflecting signals representative of the changes in the regulated electromagnetic field to a reader processor.

11. The method in accordance with claim 10, wherein reflecting signals representative of the changes in the regulated electromagnetic field to a reader processor comprises:
regulating signals representative of values of the at least one measurement characteristic of the machine measurand within the reader processor; and
reflecting the signals representative of values of the at least one measurement characteristic to at least one of a recording device and an indicating device through a reader substrate integral with the second machine substrate.

12. The method in accordance with claim 11, wherein regulating signals representative of values of the at least one measurement characteristic of the machine measurand within the reader processor comprises at least partially electrically isolating a reader conducting sub-component from the second machine substrate through forming a reader dielectric layer over at least a portion of the reader substrate.

13. The method in accordance with claim 11, wherein regulating an electromagnetic field comprises energizing the reader conducting subcomponent and configuring the reader conducting subcomponent to operate as an antenna.

14. The method in accordance with claim 10, wherein regulating the electromagnetic field with the sensor subsystem comprises at least partially electrically isolating a sensor conducting sub-component from the first machine substrate through forming a sensor dielectric layer over at least a portion of the sensor substrate.

15. The method in accordance with claim 10, wherein illuminating a sensor conducting subcomponent with the electromagnetic field comprises energizing the sensor conducting subcomponent and configuring the sensor conducting subcomponent to operate as an antenna.

16. The method in accordance with claim 10, wherein regulating the electromagnetic field comprises regulating the electromagnetic field with time-varying frequencies that sweep through a range of frequencies that encompass predetermined resonant frequencies of the sensor subsystem.

17. A turbomachine comprising:
a first component comprising a first machine substrate;
a second component comprising a second machine substrate, said second component proximate said first component; and
a monitoring system comprising a sensor subsystem comprising:
a sensor substrate integral with said first machine substrate;
a dielectric layer formed over the sensor substrate; and
a plurality of sensor subassemblies positioned at predetermined sensing positions on the dielectric layer, wherein each of the sensor subassemblies includes at least one sensor electromagnetic structure coupled to at least a portion of said sensor substrate, said at least one sensor electromagnetic structure comprising at least one sensor conducting sub-component, said at least one sensor electromagnetic structure configured to regulate electromagnetic fields incident thereto in response to at least one measurement characteristic of a machine measurand, said sensor subsystem configured to obtain at least one measurement characteristic of the machine measurand proximate a machine sensing position.

18. The turbomachine in accordance with claim 17 further comprising a reader subsystem operatively coupled to said sensor subsystem, said reader subsystem comprising:
a reader substrate integral with said second machine substrate; and
at least one reader electromagnetic subassembly comprising at least one reader conducting subcomponent configured to measure the regulated electromagnetic fields; and
a reader processor coupled to said at least one reader electromagnetic subassembly, said reader processor configured to determine values for the measurement characteristics of the machine measurand based on at least one property of the regulated electromagnetic fields.

19. The turbomachine in accordance with claim 18, wherein:
said at least one reader conducting subcomponent defines at least one reader antenna configured to transmit energy in the radio-frequency (RF) spectrum to said at least one sensor electromagnetic structure and at least one reader antenna configured to receive energy in the RF spectrum from said sensor electromagnetic structure; and
said at least one sensor conducting subcomponent defines a sensor antenna configured to respond to the RF energy transmitted from said reader electromagnetic subassembly.

20. The turbomachine in accordance with claim 17, wherein said sensor subsystem further comprises a passivation subcomponent configured to at least partially protect said at least one sensor electromagnetic structure from environmental conditions within said turbomachine.

\* \* \* \* \*